(12) United States Patent
Grannan et al.

(10) Patent No.: US 8,392,947 B2
(45) Date of Patent: Mar. 5, 2013

(54) SYSTEM AND METHOD FOR HOME AUDIO AND VIDEO COMMUNICATION

(75) Inventors: Michael F. Grannan, Austin, TX (US); Cecilia M. Martaus, San Antonio, TX (US); Roland Noll, San Antonio, TX (US); Mary Catherine McCarthy, San Antonio, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 138 days.

(21) Appl. No.: 11/479,070

(22) Filed: Jun. 30, 2006

(65) Prior Publication Data

US 2008/0022322 A1    Jan. 24, 2008

(51) Int. Cl.
*H04N 7/16*    (2011.01)
*H04N 7/173*    (2011.01)

(52) U.S. Cl. ............... 725/50; 725/39; 725/41; 725/78; 725/131; 725/133; 725/139; 725/141; 725/151; 725/153

(58) Field of Classification Search ............ 725/39, 725/78, 133, 141, 153, 41, 43, 48, 59
See application file for complete search history.

(56) References Cited

U.S. PATENT DOCUMENTS

| | | | | |
|---|---|---|---|---|
| 5,115,310 A * | 5/1992 | Takano et al. | ............... | 348/722 |
| 5,142,367 A * | 8/1992 | Hong | ............... | 348/564 |
| 5,793,366 A * | 8/1998 | Mano et al. | ............... | 715/839 |
| 5,805,806 A * | 9/1998 | McArthur | ............... | 709/250 |
| 5,883,621 A * | 3/1999 | Iwamura | ............... | 725/37 |
| 5,900,868 A * | 5/1999 | Duhault et al. | ............... | 725/42 |
| 5,956,094 A * | 9/1999 | Chun | ............... | 348/564 |
| 6,172,677 B1 * | 1/2001 | Stautner et al. | ............... | 715/716 |
| 6,177,931 B1 * | 1/2001 | Alexander et al. | ............... | 725/52 |
| 6,182,287 B1 * | 1/2001 | Schneidewend et al. | ............... | 725/48 |
| 6,295,646 B1 * | 9/2001 | Goldschmidt Iki et al. | ............... | 725/41 |
| 6,507,951 B1 * | 1/2003 | Wugofski | ............... | 725/59 |
| 6,536,041 B1 * | 3/2003 | Knudson et al. | ............... | 725/39 |
| 6,654,721 B2 | 11/2003 | Handelman | | |
| 6,774,926 B1 * | 8/2004 | Ellis et al. | ............... | 348/14.01 |
| 6,882,793 B1 * | 4/2005 | Fu et al. | ............... | 386/95 |
| 6,883,000 B1 * | 4/2005 | Gropper | ............... | 1/1 |
| 6,941,575 B2 * | 9/2005 | Allen | ............... | 725/105 |
| 7,103,905 B2 * | 9/2006 | Novak | ............... | 725/46 |
| 7,116,357 B1 * | 10/2006 | Oya et al. | ............... | 348/211.8 |
| 7,143,428 B1 * | 11/2006 | Bruck et al. | ............... | 725/37 |
| 7,231,603 B2 * | 6/2007 | Matsumoto | ............... | 715/716 |
| 7,305,697 B2 * | 12/2007 | Alao et al. | ............... | 725/114 |
| 7,454,763 B2 * | 11/2008 | Veselova et al. | ............... | 719/329 |

(Continued)

FOREIGN PATENT DOCUMENTS

WO    WO 02/47383 A1    6/2002

*Primary Examiner* — An Son P Huynh
(74) *Attorney, Agent, or Firm* — G. Michael Roebuck (57) ABSTRACT

A method for near real time data communication is disclosed. The method includes discovering a first device associated with a first location, determining available data from the first discovered device, and inserting a listing for the first discovered device into an electronic program guide (EPG). A data structure in memory is disclosed that includes a device identifier field for containing data indicating an identifier for a discovered device, a name field for containing data indicating a name associated with the discovered device, a receiver available field for containing data indicating a data receiver is available for the discovered device location, an electronic program guide (EPG) field for containing data indicating an EPG and an EPG2 field for inserting listings for discovered device data into the EPG for display to a user at an STB. A system is disclosed for near real time data communication is also disclosed.

22 Claims, 9 Drawing Sheets

U.S. PATENT DOCUMENTS

| | | | |
|---|---|---|---|
| 7,600,189 B2* | 10/2009 | Fujisawa | 715/765 |
| 7,603,683 B2* | 10/2009 | Reto | 725/34 |
| 2002/0056100 A1* | 5/2002 | Shimomura et al. | 725/39 |
| 2002/0109770 A1* | 8/2002 | Terada | 348/14.08 |
| 2002/0188944 A1* | 12/2002 | Noble | 725/39 |
| 2002/0199181 A1* | 12/2002 | Allen | 725/1 |
| 2003/0043260 A1* | 3/2003 | Yap et al. | 348/14.06 |
| 2003/0056216 A1* | 3/2003 | Wugofski et al. | 725/46 |
| 2004/0003073 A1* | 1/2004 | Krzyzanowski et al. | 709/223 |
| 2004/0032495 A1* | 2/2004 | Ortiz | 348/157 |
| 2004/0117821 A1* | 6/2004 | Karaoguz et al. | 725/37 |
| 2004/0117826 A1 | 6/2004 | Karaoguz et al. | |
| 2004/0117831 A1* | 6/2004 | Ellis et al. | 725/53 |
| 2004/0117845 A1* | 6/2004 | Karaoguz et al. | 725/134 |
| 2004/0117846 A1* | 6/2004 | Karaoguz et al. | 725/134 |
| 2004/0117850 A1* | 6/2004 | Karaoguz et al. | 725/134 |
| 2004/0246376 A1* | 12/2004 | Sekiguchi et al. | 348/468 |
| 2005/0028208 A1* | 2/2005 | Ellis et al. | 725/58 |
| 2005/0071427 A1* | 3/2005 | Dorner et al. | 709/204 |
| 2005/0108770 A1* | 5/2005 | Karaoguz et al. | 725/131 |
| 2005/0138617 A1* | 6/2005 | Friedman | 717/174 |
| 2005/0141855 A1* | 6/2005 | Watanabe | 386/46 |
| 2005/0172315 A1* | 8/2005 | Chen | 725/39 |
| 2005/0195274 A1* | 9/2005 | AbiEzzi et al. | 348/14.02 |
| 2005/0235312 A1* | 10/2005 | Karaoguz et al. | 725/38 |
| 2005/0251827 A1* | 11/2005 | Ellis et al. | 725/47 |
| 2005/0262542 A1* | 11/2005 | DeWeese et al. | 725/106 |
| 2006/0031883 A1* | 2/2006 | Ellis et al. | 725/58 |
| 2006/0150214 A1* | 7/2006 | Ramraz et al. | 725/44 |
| 2006/0230427 A1* | 10/2006 | Kunkel et al. | 725/133 |
| 2006/0248557 A1* | 11/2006 | Stark et al. | 725/37 |
| 2007/0061842 A1* | 3/2007 | Walter et al. | 725/48 |
| 2007/0157281 A1* | 7/2007 | Ellis et al. | 725/134 |
| 2007/0204231 A1* | 8/2007 | Cunningham et al. | 715/734 |
| 2007/0283391 A1* | 12/2007 | Connelly et al. | 725/44 |
| 2009/0282098 A1* | 11/2009 | Karaoguz et al. | 709/203 |
| 2010/0031295 A1* | 2/2010 | Krzyzanowski et al. | 725/52 |

* cited by examiner

| GUIDE | | | | |
|---|---|---|---|---|
| WED 5/24 | 7:00 PM | 7:30PM | 8:00 PM | 8:30 PM |
| 16 FOX | American Idol | | | |
| 17 LIFE | See You In My Dreams | | Miracle Run | |
| 18 FOOD | Emeril Live | | Secret Life... | Sugar Rush |
| 20 WGN | Becker | | Home Improvement | |
| 21 LIFE | See You In My Dreams | | Miracle Run | |
| 22 Front Door | Live Camera from Front Door | | | |
| 23 LR Cam | Live Camera from Living Room (Set Top) | | | |
| 24 Baby Cam | Live Camera from Baby's Room | | | |
| 25 Upst Audio | Upstairs Audio Speaker and Microphone | | | |
| 26 Whole | View All Cameras | | | |

Live Camera from Baby's Room
Ongoing Footage
In Home Video Source

| GUIDE | | | | | |
|---|---|---|---|---|---|
| WED 5/24 | 7:00 PM | 7:30PM | 8:00 PM | 8:30 PM | |
| 16 FOX | American Idol | | | | |
| 17 LIFE | See You In My Dreams | | Miracle Run | | |
| 18 FOOD | Emeril Live | | Secret Life... | Sugar Rush | |
| 20 WGN | Becker | | Home Improvement | | |
| 21 LIFE | See You In My Dreams | | Miracle Run | | |
| 22 Front Door | Live Camera from Front Door | | | | |
| 23 LR Cam | Live Camera from Living Room (Set Top) | | | | |
| 24 Baby Cam | Live Camera from Baby's Room | | | | |
| 25 Upst Audio | Upstairs Audio Speaker and Microphone | | | | |
| 26 Whole House | View All Cameras | | | | |

View All Cameras
Ongoing Footage
In Home Video Source – select this channel to view all camera sources in the home at once.

SYSTEM AND METHOD FOR HOME AUDIO AND VIDEO COMMUNICATION

FIELD OF THE DISCLOSURE

The present disclosure relates generally to Internet based in-home video and audio distribution models.

BACKGROUND

The advent of digital video recorders and on-demand and pay per view programming from television service providers symbolizes the shift in consumer preference to view video programming when they want to, not when the program is broadcast. In order to provide a more flexible architecture for making a large volume of content available on demand, major telecommunications carriers are in the midst of rolling out television delivered via Internet Protocol Television (IPTV), and cable companies are similarly planning to migrate cable networks to support a switched (rather than broadcast) programming viewing paradigm.

Major telecommunications companies are seeking to compete with cable companies as video providers by providing broadcast video services either via Fiber to the Home (FTTH) networks, which carry data signals to the home with fiber, and Fiber to the Node (FTTN) networks, which build fiber deeper into neighborhoods, getting it close enough to make the remaining copper phone line loop length short enough to provide enough bandwidth to send multiple television streams. Such networks are capable of being configured as a "switched" video architecture, sending only one channel to each television in the home. Unlike broadcast networks like standard cable television and satellite television, which broadcast an array of channels and leave the "tuning" of the channel desired to the TV or set top box, with switched video architectures the channel change occurs in the network.

DETAILED DESCRIPTION

Having an IP based television set top box with an electronic program guide (EPG) combining traditional live broadcast, on demand content, and programs that have been digitally recorded by the consumer, creates an opportunity to leverage the same system and user interface to let the consumer watch video streams originating in their own home, or perhaps remotely view video originating from a second vacation home. In an illustrative embodiment attaching/incorporating a camera in an IPTV set top box, and/or additionally recognizing the presence of other IP based cameras on the home network, the television set is capable of becoming the primary access device for monitoring the home and communicating with others in the home.

In a particular embodiment a method for data communication is disclosed. The method includes discovering a first device associated with a first location, determining whether there is data available from the first discovered device, identifying one of a video and audio device, and inserting a listing for the first discovered device and data available into an electronic program guide (EPG). In another aspect of a particular embodiment the data is selected from the group consisting of near real time audio data and near real time video data. In another aspect of a particular embodiment the method further includes accepting a user selection from the EPG of the listing for the discovered device from which to receive the available data. In another aspect of a particular embodiment the method further includes sending data to a second discovered device at the first location associated with the first selected discovered device. In another aspect of a particular embodiment the method further includes displaying a name associated with the first discovered device, wherein the name is selected from a group consisting of a user and a location. In another aspect of a particular embodiment the method further includes establishing 2-way data communication between the second discovered device and a third discovered device at a user location. In another aspect of a particular embodiment the method further includes processing the available data wherein processing is selected from the group consisting of recording, displaying and reproducing on an audio speaker. In another aspect of a particular embodiment the method further includes displaying a plurality of screen displays, each of the plurality of screen displays associated with one of a plurality of discovered devices, receiving a user selection indicating one of the screen displays, and establishing data communication with a location associated with the one discovered device associated with the selected screen display.

In another particular embodiment a computer readable medium, containing a computer program for data communication is disclosed. The computer program includes instructions to discover a first device associated with a first location, instructions to determine whether there is data available from the discovered first device, and instructions to insert a listing for the discovered device and data available into an electronic program guide (EPG). In another aspect of a particular embodiment the data comprises near real time data. In another aspect of a particular embodiment the computer program further includes instructions to accept a user selection from the EPG of the discovered device from which to receive available data. In another aspect of a particular embodiment the computer program further includes instructions to send data to a second discovered device at the first location associated with the first selected discovered device. In another aspect of a particular embodiment the computer program further includes instructions to display a name associated with the first discovered device, wherein the name is one selected from a group consisting of a user and a location. In another aspect of a particular embodiment the computer program further includes instructions to establish 2-way data communication between the second discovered device and a third discovered device at a user location. In another aspect of a particular embodiment the computer program further includes instructions to display a plurality of screen displays, each of the plurality of screen displays associated with one of a plurality of discovered devices, instructions to receive a user selection indicating one of the screen displays, and instructions to establish data communication with a location associated with the one discovered device associated with the selected screen display.

In another particular embodiment a data structure in memory is disclosed. The data structure includes a device identifier field for containing data indicating an identifier for a discovered device, a name field for containing data indicating a name associated with the discovered device, a receiver available field for containing data indicating a data receiver is available for the discovered device, an EPG field for containing data indicating an EPG, and an EPG 2 field for containing data indicating a listing for inserting a listing for a discovered device data into the EPG for display to a user. In another aspect of a particular embodiment wherein the data is selected from the group consisting of audio data and video data. In another aspect of a particular embodiment wherein the name is selected from the group consisting of user data and location data. In another aspect of a particular embodiment the data structure further includes a stream available field for containing data indicating that data is available from a discovered device identified in the device identifier field. In another aspect of a particular embodiment the data structure further includes a data communication available field for containing data indicating that data communication is available to send to a second discovered device at a location associated with the discovered device.

In another particular embodiment a system for near real time data communication is disclosed. The system includes a processor in data communication with a memory, and a computer program executed by the processor, the computer program comprising instructions to discover a first device associated with a first location, instructions to determine whether there is data available from the first discovered device and instructions to insert a listing for the first discovered device and data available into an electronic program guide (EPG). In another aspect of a particular embodiment wherein the data comprises near real time data selected from the group consisting of audio data and video data. In another aspect of a particular embodiment the computer program further includes instructions to accept a user selection of the first discovered device from the EPG from which to receive the available data. In another aspect of a particular embodiment the computer program further includes instructions to send data to a second discovered device at the first location. In another aspect of a particular embodiment the computer program further includes instructions to display a name associated with the first discovered device, wherein the name is selected from a group consisting of a user and a location. In another aspect of a particular embodiment the computer program further includes instructions to establish 2-way data communication between a second discovered device associated with the first location and a third discovered device at a user location. In another aspect of a particular embodiment the computer program further includes instructions to display a plurality of screen displays, each of the plurality of screen displays associated with one of a plurality of discovered devices, instructions to receive a user selection indicating one of the plurality of screen displays and instructions to establish data communication with a second device at the location of the discovered device associated with the selected screen display.

In an illustrative embodiment, an IP based television STB is provided for displaying an EPG combining traditional live broadcast, on demand content, and programs that have been digitally recorded by the consumer, is used to create an opportunity to leverage the same system and user interface to let the consumer watch video streams or listen to audio data originating in their own home, or perhaps remotely view video originating from a second vacation home. In an illustrative embodiment by attaching a camera to an IPTV set top box, and/or additionally recognizing the presence of other IP based cameras on the home network, the STB via television set interface is capable of serving as the primary access device for monitoring the home and communicating with others in the home.

Figure 1:
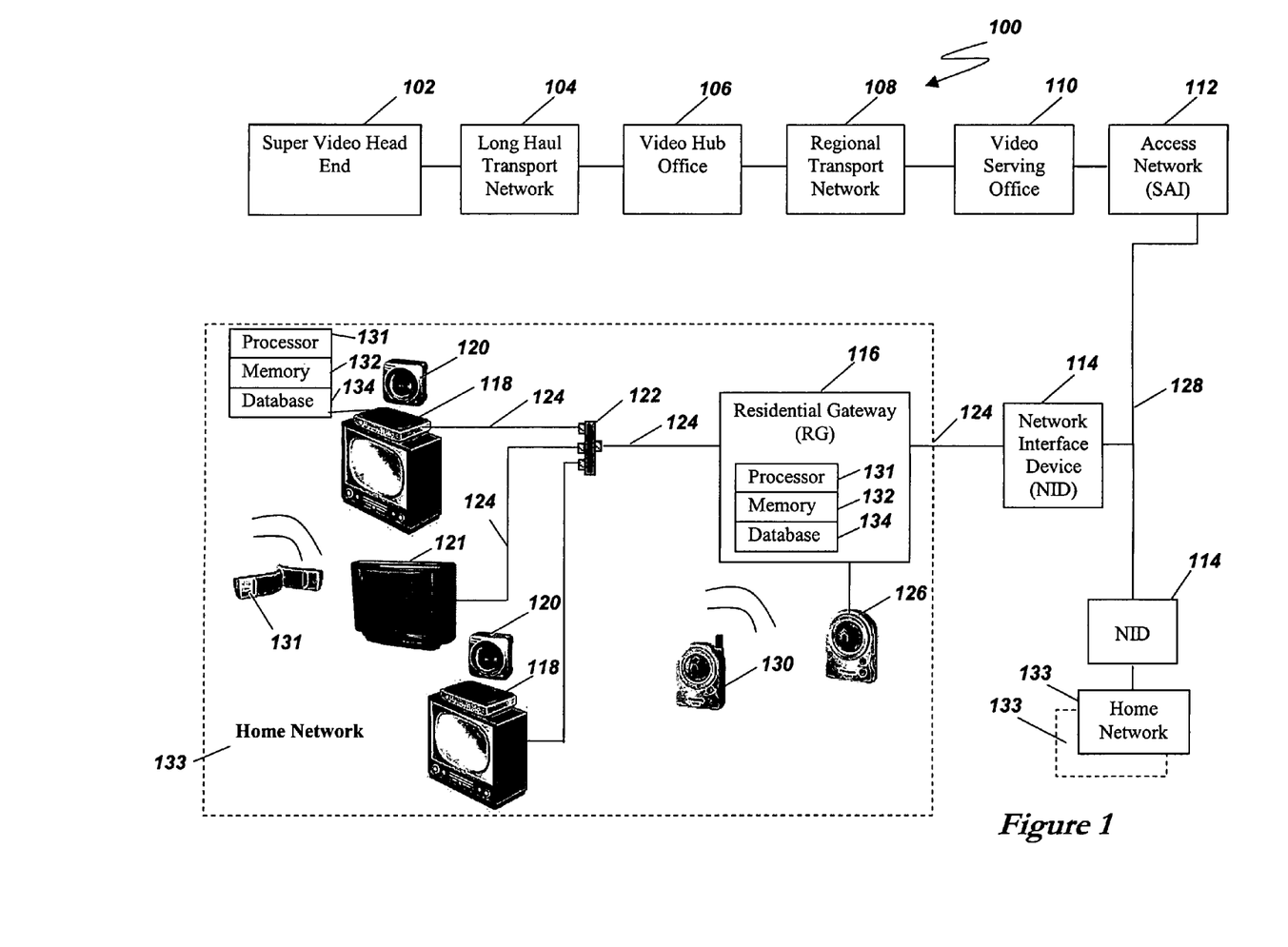
FIG. 1 is a block diagram of a FTTH or FTTN high speed data network architecture, supporting delivery of voice, video, and data to a variety of home consumption devices connected to a home network, including televisions, computers, and video cameras.

FIG. 1 is a block diagram of depicting the architectural components of a high speed network capable of delivering data, voice, and video. This diagram portrays an illustrative approach telecommunications companies are taking to deploy FTTN or FTTH based networks to deliver IP television signals.

The Super Video Head End (SVHE) 102 is the major facility where standard broadcast stations are received and prepared for transmission via Internet Protocol (IP). Stations can be received by the SVHE via a telecommunications link directly from the broadcast station, or more commonly via satellite transmission. The SVHE receives standard cable type national (network) broadcast channels via satellite, and encodes them into a standard format (e.g. MPEG-4, H.264) for transmission over the Internet via some form of long haul network transport 104 such as Gigabit Ethernet. A multi-state deployment of internet protocol television (IPTV), for example, may use only two SVHE's—one for redundancy. In the illustrative video distribution method defined herein, the SVHE may act as either a central warehouse for user created video as well. In an illustrative embodiment, peer to peer technology is used to decentralize the uploading and rapid dissemination of user originated authored content. In this case the SVHE could act as any normal peer to peer client (like any other user with a PC) to receive any video content television subscribers created and wished to make available to other subscribers of the television service.

Several Video Hub Offices 106 (VHOs) are connected to the SVHE via a long haul transport network 104. VHO's would be commonly deployed in metropolitan areas. In addition to receiving the numerous television channels via Internet Protocol from the SVHE, the VHO is the logical insertion point for local channels (e.g. receiving local network channels via over the air antennas) and other local programming and content information.

Each Central Office of a telecommunications network (which provides standard telephone service and broadband services like Digital Subscriber Line (DSL) today) can be configured to be a Video Serving Office (VSO). VSO's similarly receive programming from the VHO's via some form of high speed Internet Protocol network, such as Gigabit Ethernet. VSOs in turn feed the data to a local access network 112. In the case of FTTH deployments, this access network is comprised of fiber going from the VHO all the way to each customer's home. In the case of FTTN deployments, fiber is typically run to a Service Access Interface 112 (SAI) box via fiber, which in turn sends high speed data to the home over existing telephone copper wiring. The SAI's are placed deep in the neighborhoods so as to shorten the copper loop length sufficiently so as to facilitate the transmission of high speed data over the copper line, typically in excess of 25 megabits per second (Mbps). Such bandwidth is capable of providing several standard definition (SD) or high definition (HD) video streams with proper compression.

Similar to the way telephone wiring is brought to a home today by connecting it to a network interface device 114 (NID) on the side of the home, a NID capable of receiving a phone line with a high speed data signal (e.g. VDSL2) is installed on the side of the home. The purpose of the NID is to facilitate in-home delivery of the high speed data signal. The standard telephone wiring in the home could be used (as is the case with most DSL deployments today), or alternatively wireless (e.g. WiFi, Ultra Wideband), broadband over power line (BPL), or coaxial cable (e.g. Home Phone Networking Alliance (HPNA) or Multimedia over Coax Alliance (MoCA)) could be used. FIG. 1 shows an illustrative embodiment of providing in-home distribution of voice, data, and video signals via utilization of the existing coaxial wiring for cable television in the home.

The NID connects to a gateway, such as a Residential Gateway 116 (RG) in the home. The RG facilitates home networking via one or more implementations. Many RG's today support wireless home networking via the IEEE WiFi standard, which lets users connect to the Internet wirelessly from a laptop computer for example. The home networking implementation shown in this figure not only supports wireless networking, but uses the coaxial wiring to distribute data packets (in particular video streams) to other devices in the home including televisions equipped with IP set top boxes (STBs) 118, and even televisions without any STB whatsoever. Each RG and STB includes a processor 135 coupled to memory 132 and a database 134 in the memory.

Subscribers of Internet television usually have at least one IP enabled set top box in order to watch IP television. The IP-STB receives television programming via Internet protocol (IP) over the coaxial wiring 124 using a technology such as HPNA or MoCA and decodes the packets into a television signal, which is sent to a standard television via HDMI or component jacks 122. An STB may be capable of decoding and sending more than one video stream. The home network depicted in FIG. 1 shows a second television 121 connected via standard coaxial cable only, like a standard analog television using analog based cable television might be connected. Such a television can receive a separate IP video stream using the home network by incorporating a remote control that uses Radio Frequency (RF) so as to avoid the need for line of sight communication between the remote control and television. In this manner, the remote for the second TV is actually communicating with the IP-STB on the other television, which is tuning to a different channel and then transmitting the channel in analog format to the other television via the coaxial cable network in the home. (Because of this, the analog TV can still tune to camera feeds 120, 126, 130 and audio feed 131 in the home that are being supported by the STB.) The STB may also have a Universal Serial Bus (USB) or similar connection for connecting a camera directly. Alternatively, the IP-STB may have a camera 120 directly integrated within its own housing.

The home network also may contain a combination of wired and wireless cameras. Wired cameras can be connected to the home network via Ethernet cabling, or alternatively via power line networking technology. By utilizing power line networking, a wired camera would not require an Ethernet jack, rather a power line adapter that plugs into a standard electrical outlet on one end, and to the camera via Ethernet cable on the other end, could be used. The residential gateway would similarly have to be connected to the power line network by plugging a similar adapter into one of its available Ethernet ports. Wireless cameras that communicate to the RG via WiFi, Ultra Wideband, or other wireless networking technologies could also be utilized.

The home network may also include one or more wired or wireless speaker modules 131, optionally including a microphone to provide a return path for audio communications to the STB. The video and audio data described herein can be recorded in near real time. The term "near real time" is used herein to mean data transmitted "live" such as live video or live audio with only a delay encountered for transmission of the data through the connecting electronics, networks, devices, STB and/or IPTV networks and systems.

Figure 2:
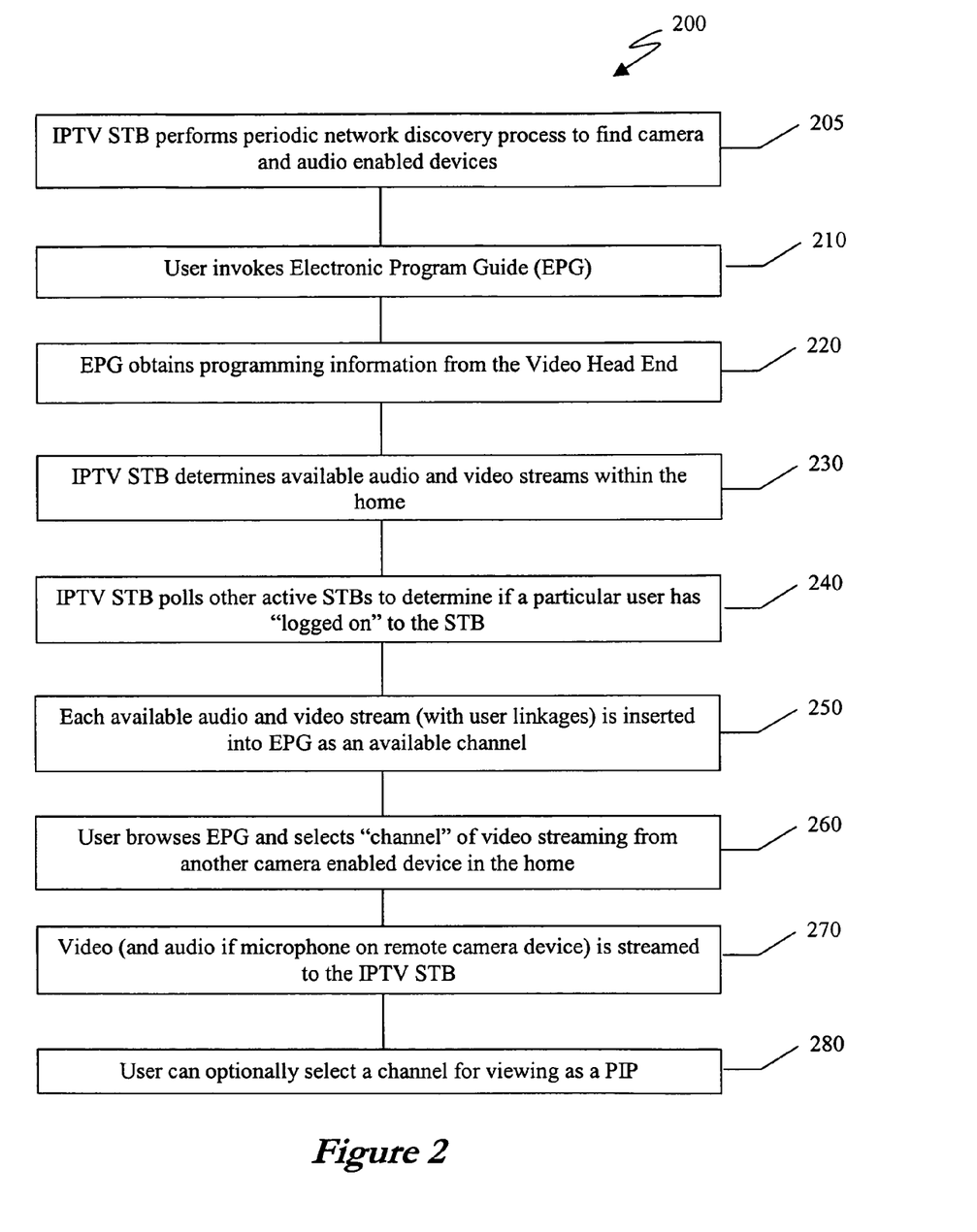
FIG. 2 depicts a flowchart of a method for illustrative embodiment of a discovering and distributing audio and video data stream.

FIG. 2 shows the process used by a television STB to discover camera and audio devices on the home network, for the purposes of incorporating the available media resources into its EPG. (Note: This could similarly be implemented on any other television STB including satellite and digital cable that was connected to a home network via TCP/IP.)

First, the STB 118 discovers audio 131 capable devices and video 120, 126, 130 capable devices that are connected to the home network. At power on, the STB invokes a device discovery process 205 expressly for this purpose, and will periodically repeat the discovery process to ensure its device table is updated (in case new cameras or audio devices are added to the network). Naturally the STB could be aware of other STB devices on the home network and query those other STBs for camera support (either built into the STB or connected as an adjunct device via USB or other similar connection), but the system provides support for other non-STB related cameras as well. One method of supporting device discovery of cameras 120, 126, 130 and audio devices 131 is Universal Plug and Play (UPnP). UPnP offers the advantage of being device and operating system independent, and is capable of letting control points (like the STB) discover new devices as they are added to the home network. When a UPnP device is added to the home network, it obtains an IP address via the Dynamic Host Configuration Protocol (DHCP) from the residential gateway. The IPTV STB can then use the URL provided by the device in the discovery process, to get more specific information about the camera or audio device. The IPTV STB maintains a data structure containing data fields for containing data indicating camera and audio devices discovered on the home network. The data structure is described in more detail in connection with FIG. 8, below.

It should be noted that alternative device discovery techniques could be used, instead of UPnP. Many camera security systems today support device discovery by supporting sending a multicast domain name service (DNS) messages over the network. In this case, the STB could send such a message, then receive message replies from every camera, video or audio device connected to the network that conveys camera IP address, description, MAC address, etc. for each discovered device. Alternatively, there are also many network monitoring tools that perform standard device discovery. There is also additional research underway at universities, such as some work at the Massachusetts Institute of Technology (MIT), around a concept called an intentional naming system. The intentional naming system is server less and self configuring, using a decentralized spanning tree algorithm and some type of naming language (e.g., XML) to support client devices making queries to obtain attribute values for other devices on the network. Another device discovery technique could be a proprietary approach.

The data structure containing data indicating camera 120, 126, 130 and audio devices 131 will not be used until the television subscriber accesses the electronic program guide (EPG) 210. The EPG historically accesses cached program information (in the case of cable and satellite STBs) and/or dynamically obtains updated programming information from the Video Head End 220. Elements from the data structure will be incorporated into and displayed along with the EPG as a modified EPG containing audio and video device indicators.

During the process of incorporating cameras and audio devices indicators into the EPG, however, the STB looks at its current device table or data structure 800 (described in connection with FIG. 8 below) of devices discovered in 205 to determine which audio and video streams are available for presentation on the STB 230.

While most standard broadcast cable and satellite STBs do not attempt to identify the particular subscriber in the family currently controlling the STB, IP-based television services may attempt to do so in order to provide a customized program guide and other look and feel attributes that the particular subscriber prefers. One simple example of a way to identify a particular user within the family that is using the STB is via a 4-digit PIN. In this way, when a user types in their 4-digit PIN the user interface of the STB is customized according to their pre-defined preferences. This identifying information can also be used to provide more details on the camera feeds that may be connected to other STBs in the home. For example, if the mother of the family has identified herself to the STB in the family room, the resulting EPGs displayed on any other STB in the home can identify not only the camera source, but the fact that "Mom" is at that location. Thus the STB, either through its device table setup, or a subsequent polling process of other STBs, determine if a particular user can be identified as being the person watching television from another STB in the home 240.

The video camera 120, 126, 130 and audio devices 131 known to the STB are then used to create one or more separate channels 250 for each device listed in the EPG. This makes it easy for television viewers to see available cameras in their home within the program guide, and select one for viewing 260 the same way they would select a normal television show to watch. The selected camera, video or audio device signal is then streamed over the home network to the STB and presented on the television 270. It should be noted that the subscriber could select one of the channels for viewing via Picture in Picture (PIP) 280. In this manner, the viewer could keep watching her desired television show while having a live video feed within the home on the screen simultaneously in a PIP. For example, this could easily be used as a baby camera monitor by selecting a camera that is set up in the baby's room. A user can setup video and/or audio communication between an audio and video device at the user location and a location for a selected device discovered by the STB.

Figure 3:
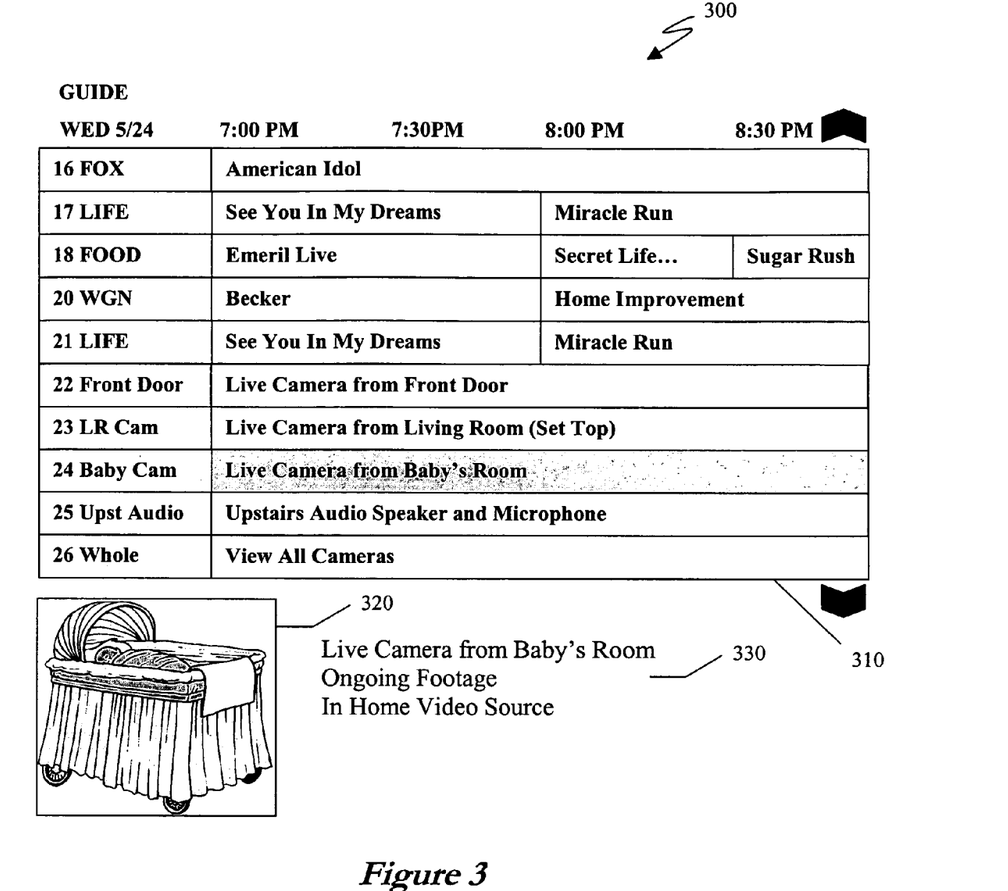
FIG. 3 is an illustrative view of an electronic program guide (EPG) with live video and audio feeds incorporated.

FIG. 3 illustrates an EPG with the video and audio feeds discovered by the STB incorporated into the channel list. With IPTV, when users actually select a particular channel 310 in the EPG, the current broadcast of the channel selected is shown in a PIP 320 right within the EPG display. The details of the show (e.g., title, time duration and time remaining, description) are shown in a caption 330 along with the video footage. When the camera and audio sources are integrated into the EPG, the television subscriber can similarly tune to one of the cameras or audio devices discovered in the home and view it or listen to it via the television set. Additionally, a user could tune to the channel for a full screen view of the video or audio feed. The user can also decide (if they have a camera on the set top device they are using) to set up a 2-way video and/or audio conference with the other person. An audio and/or video connection can be made between any two or more audio and/or video devices. Audio can be derived either from a built-in microphone on the STB (or camera connected to it); alternatively audio could be supported directly from the remote control via wireless technologies including Zigbee, WiFi, or data RF.

Figure 4:
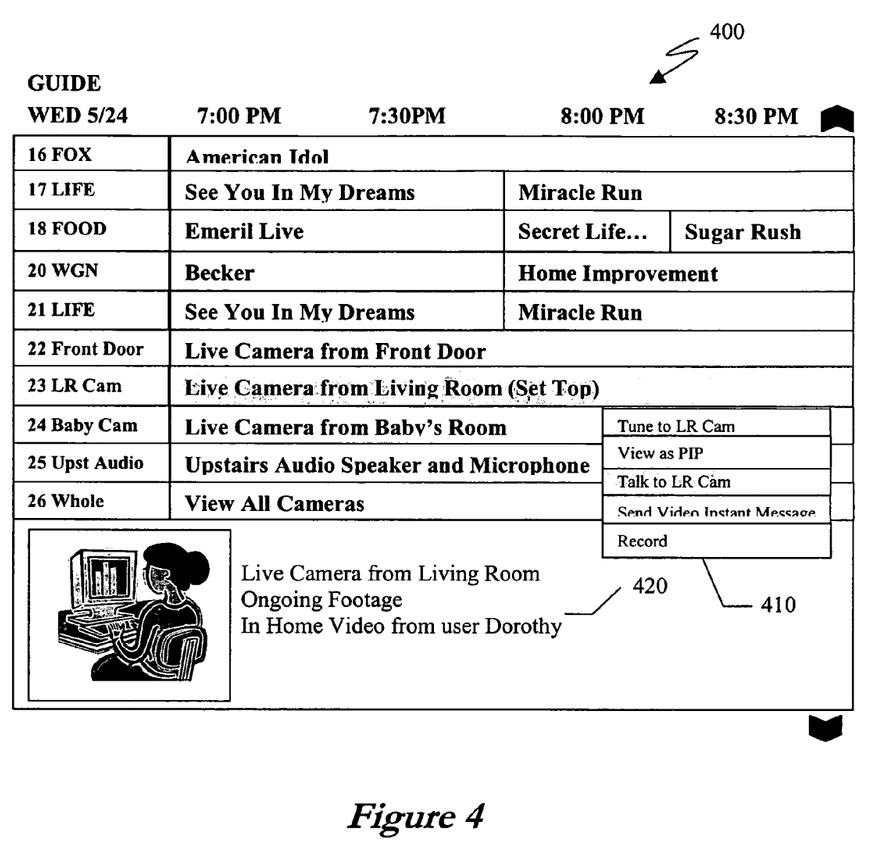
FIG. 4 further illustrates additional features of the in home audio/video integration within the EPG allowing options for interacting with a discovered video stream.

FIG. 4 illustrates the submenu of features that can be invoked in an illustrative embodiment by a television viewer input device such as a remote control and cursor when selecting another STB that has an integrated camera. In this example the viewer has selected another STB which is positioned in the living room. The user can select from a submenu 410 of options that enable them to "tune" to the video camera either connected to, or directly integrated into the STB, view the camera feed as a PIP in addition to the current television program they are watching, set up 2-way video or audio communications with the STB and the location shown in the PIP, or record a quick video or audio message that will be transmitted to the other STB very much the same way cellular push-to-talk and instant messaging services work today. Lastly, the option to record the camera or audio feed for a certain duration of time is possible if the STB has digital video recorder (DVR) capability or sufficient memory to hold a recording. Note that since Dorothy logged in to the STB in the living room by entering her unique 4-digit PIN (or some other similar authentication technique) the viewer's STB is able to convey that Dorothy is on the STB in the caption description of the program 420. (Alternatively Dorothy's name could appear in the EPG listing, i.e. "Live Camera from Living Room—Dorothy.") In another illustrative embodiment, audio and video devices communicate or send data to each other through wireless, RF, wire line, power line, RG or IPTV with the data passing through the STB during the transmission.

Figure 8:
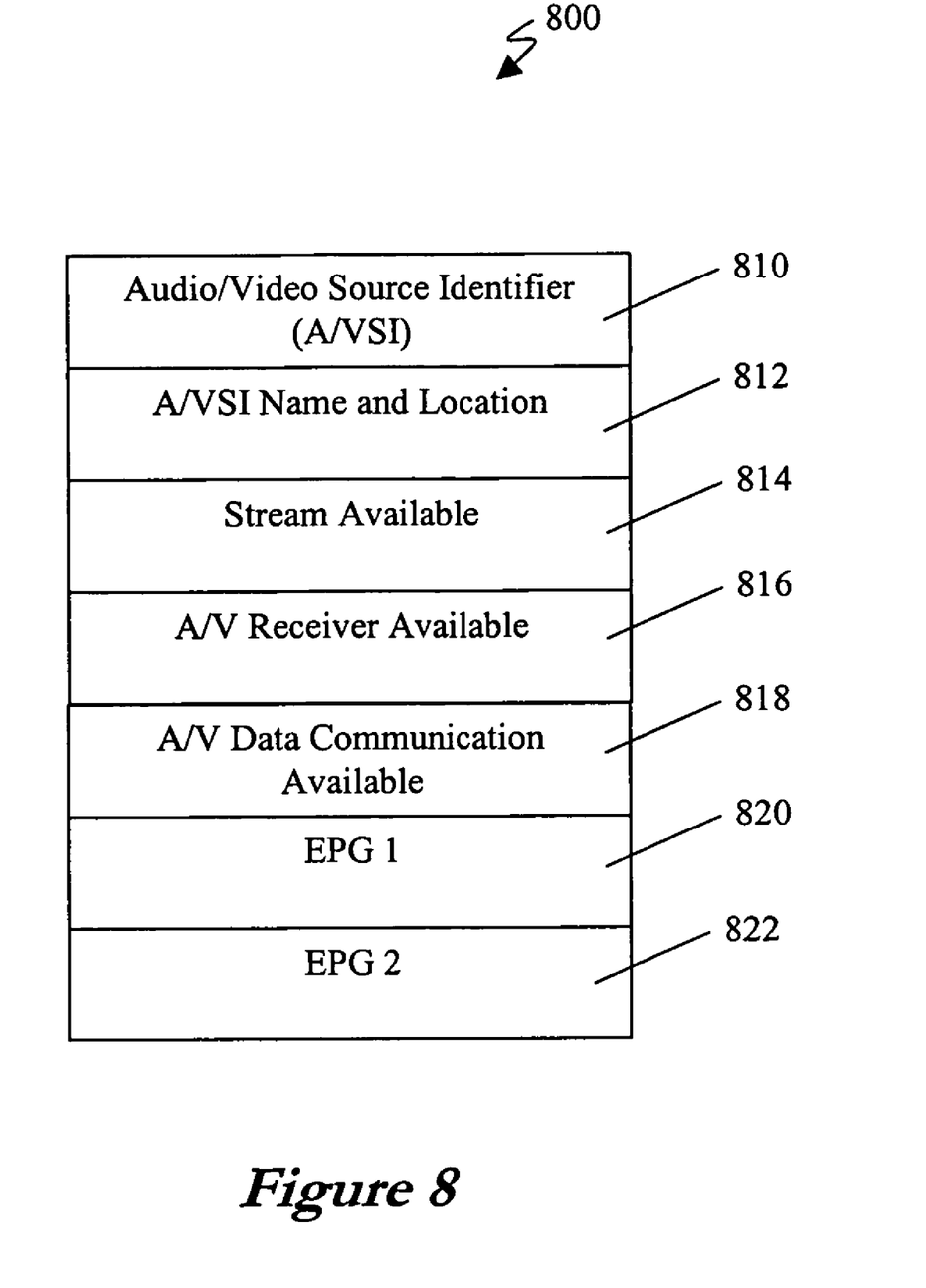
FIG. 8 is an illustrative embodiment of a data structure for inserting listings into an EPG.

The discovered video and audio devices and locations thereof can be identified in the EPG by name data which may identify the data type (audio or video data) and the location (living room, game room, baby's room, etc.). An object person may also be identified as a person who is being seen or heard, such as "Mom in the Study." An identifier for each discovered device, for example a MAC address for the discovered device, can be used to uniquely identify each discovered device in the device table or data structure as shown in FIG. 8. An initial name may appear based on the discovered device type. The discovered device type may be an audio or video device. Thus, initial names can be audio input 1, 2, 3, etc.; audio output 1, 2, 3, etc.; camera 1, 2, 3, etc.; and video monitor 1, 2, 3, etc.; A user may view input from each of the discovered input devices and name them according by location.

For example, when viewing input from camera 1, the user may see that camera1 1 is in the game room and rename camera 1 (using an input device to the STB such as a remote control (RC)) as "game room video" or "view game room." This name can be stored in the data structure discussed in association with FIG. 8. Similarly when listening to audio input data from audio input 1, the user may identify the location as the living room and rename audio input 1 as "living room audio in", or "listen to living room". Audio outputs can be renamed as "speak to living room", etc. Video monitors can be renamed as "send video to living room", etc.

An object person at particular locations can be identified by user identifiers such as user logon identifiers or signature keystroke patterns or activity patterns associated with a user.

Figure 5:
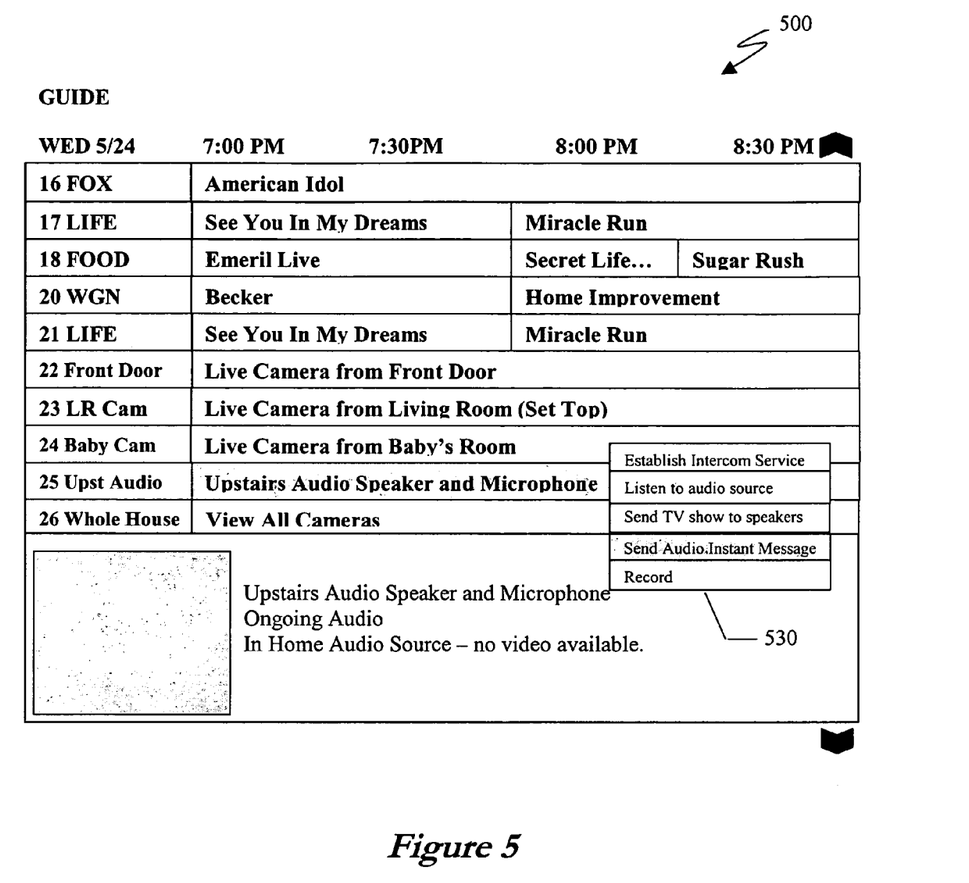
FIG. 5 further illustrates additional features of the in home audio/video integration within the EPG allowing options for interacting with a discovered audio stream.

FIG. 5 illustrates a submenu of features that can be invoked when selecting an audio only source that has been discovered on the network. Video and audio data are presented as listings in the enhance EPG (EPG2) for selection by a user using a remote control to selection options or listings from EPG2. The audio only source may consist of a speaker-microphone unit that is connected via a standard wireless home network like WiFi, Ultra Wideband (UWB), or other wireless technology. Alternatively the speaker-microphone unit may be connected via Ethernet or power line networking. In this instance, the viewer can select an option from a submenu 430 options of establishing an intercom service so 2-way audio communications can be established between the STB and the remote speaker-microphone, listening to the audio source coming from the microphone in the unit, distributing the audio of the TV show currently being watched from the STB to the unit, or sending an audio instant message. The remote device may also be a speaker only unit with no microphone built-in, whereupon the first two items in the submenu would not be presented. Thus, the pull down menus are adaptive, displaying only those attributes and items for which a discovered device is capable of performing.

Figure 6:
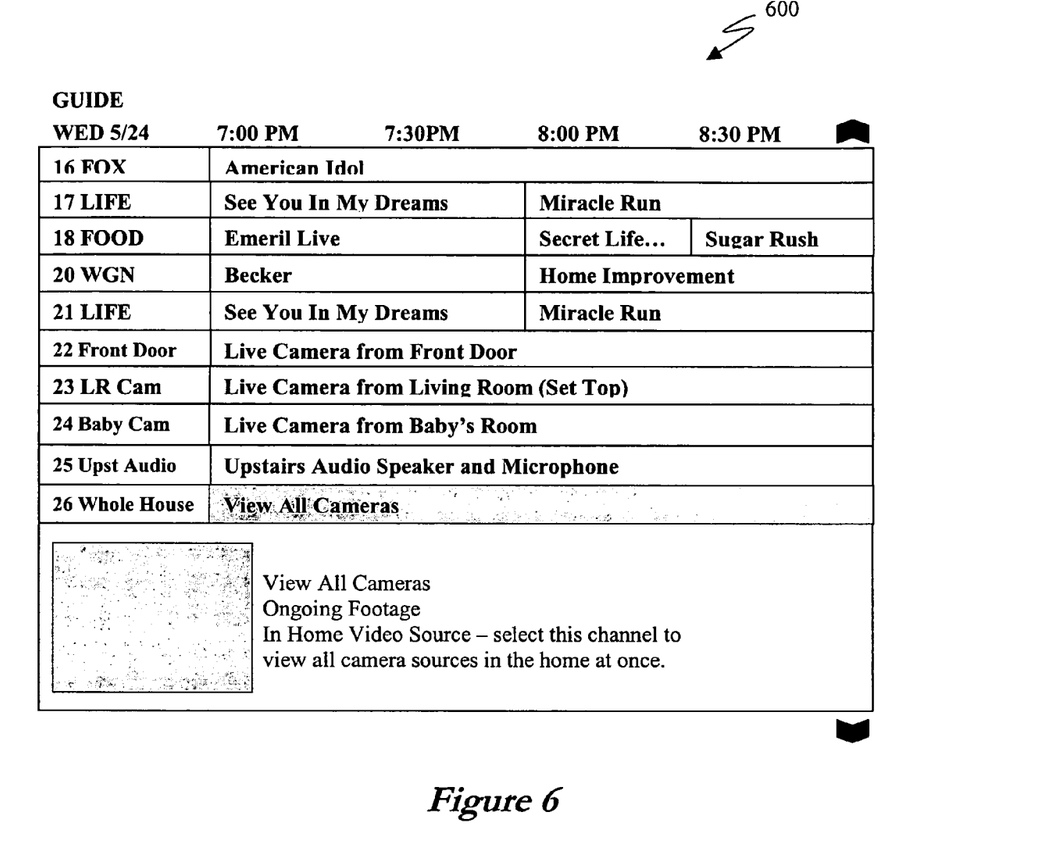
FIG. 6 is an illustrative embodiment of an EPG providing a "view all cameras" option.
Figure 7:
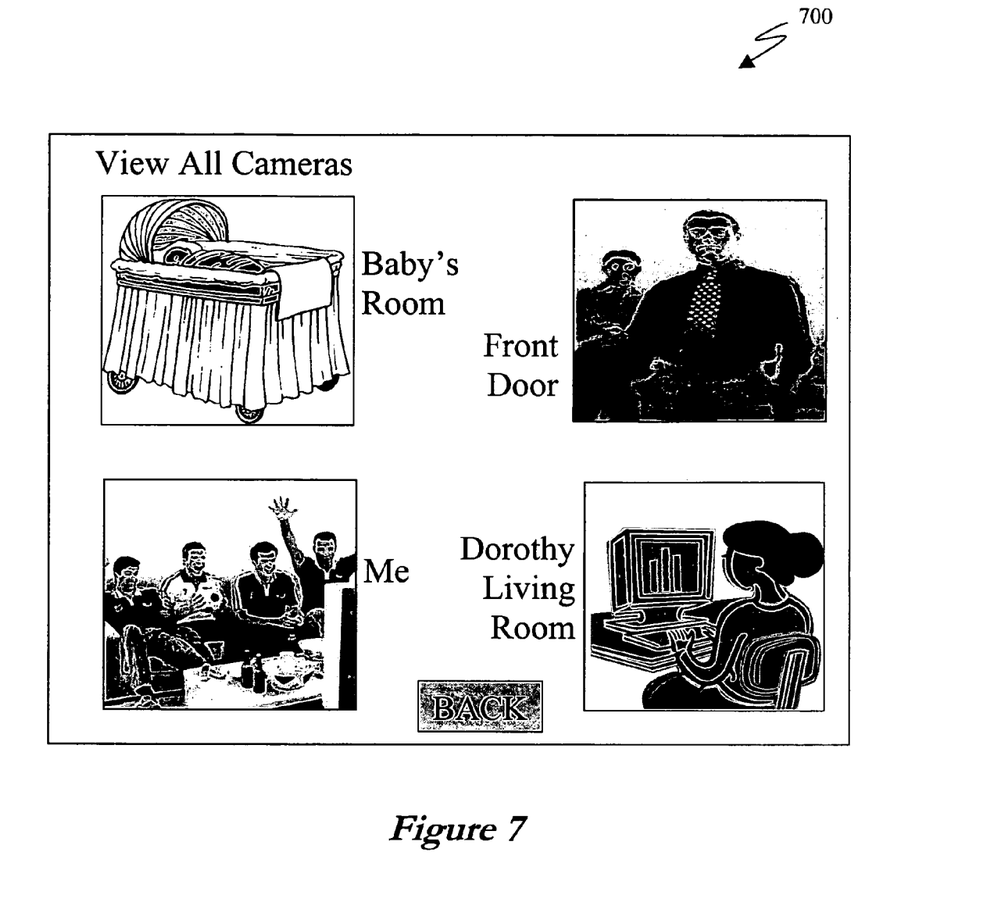
FIG. 7 is an illustrative embodiment showing a "view all cameras" display.

FIGS. 6 and 7 illustrate how the television viewer could bring up a mosaic of all the cameras connected throughout the home, for monitoring purposes. There is a separate television channel in the EPG2 (shown in FIG. 6) facilitating the viewing of all camera feeds at once in a composite view on the television screen. When the user selects this channel, form EPG2, multiple PIP images are presented (FIG. 7) that the user may watch. A user may click using a remote control associated with the STB on a PIP display to establish audio and/or video communication with the location viewed in the selected PIP.

FIG. 8 is an illustrative embodiment of a data structure. The data structure includes a audio/video source identifier (A/VSI) field (device identifier field) 810 for containing data indicating an identifier for a device, an A/VSI name and location field 812 (name field) for containing data indicating a name associated with the device, a stream available field 814 for containing data indicating whether an audio or video data is available from the A/VSI device identified by the source identifier, an A/V receiver available field 816 for containing data indicating a data receiver is available for the device, an A/V data communication available field 818 for indicating whether a data communication is available for the ANSI identified device, an EPG1 field 820 for containing data indicating an electronic program guide EPG1 and an EPG 2 field 822 for inserting a listing for a discovered device data into the EPG1 for EPG2 for display to a user.

In another illustrative embodiment a user can select a video or audio stream to be sent to an external audio or video device outside of the home via the IPTV network. In another illustrative embodiment a user can receive a video or audio from the house from a remote receiver or IP device and/or establish video or audio communication between the remote location and the audio and/or video devices in the home. In another illustrative embodiment motion detection on a camera sends alert to an STB, alternatively email/SMS to additional device. In another illustrative embodiment, with management of available viewers at STBs and a buddy list of viewers with who a viewer wishes to communicate to set up video sessions or audio with friends and neighbors that appear on the buddy list. In another illustrative embodiment peer to peer video distribution "live broadcast" is provided.

In another illustrative embodiment a method for monitoring home remotely or controlling appliances in home via IPTV interface/portal is provided. Technologies to use are Zigbee, XIO, or RF remotes.

In another illustrative embodiment, IP-TV user interface is provided for that contains easy wizards to (1) identify Zigbee and RFID supported devices dynamically and incorporate functionality into the control interface, (2) let user set up X10 control codes for various appliances based on what she has configured in her home, (3) include smart remote capability to let user define other audio and/or video equipment in the home and where it is, so RF can be used to control other devices (and in this case the "closest" STB could be used to transfer the RF signals if it is with the other audio and/or video equipment to be controlled).

Figure 9:
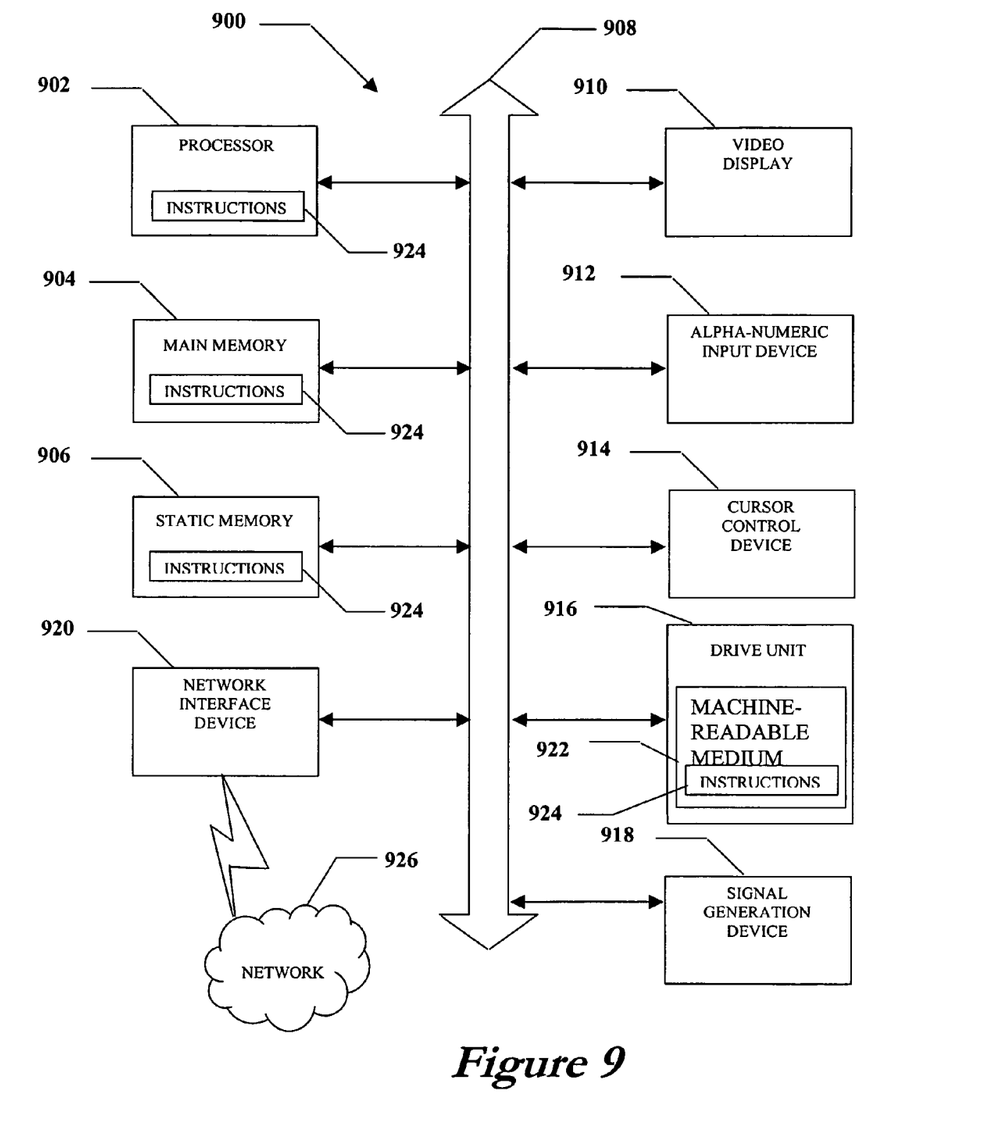
FIG. 9 is an illustrative embodiment of a machine for performing functions disclosed.

FIG. 9 is a diagrammatic representation of a machine in the form of a computer system 900 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (e.g., a central processing unit (CPU), a graphics processing unit (GPU), or both), a main memory 904 and a static memory 906, which communicate with each other via a bus 908. The computer system 900 may further include a video display unit 910 (e.g., a liquid crystal display (LCD), a flat panel, a solid state display, or a cathode ray tube (CRT)). The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a machine-readable medium 922 on which is stored one or more sets of instructions (e.g., software 924) embodying any one or more of the methodologies or functions described herein, including those methods illustrated in herein above. The instructions 924 may also reside, completely or at least partially, within the main memory 904, the static memory 906, and/or within the processor 902 during execution thereof by the computer system 900. The main memory 904 and the processor 902 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 924, or that which receives and executes instructions 924 so that a device connected to a network environment 926 can send or receive voice, video or data, and to communicate over the network 926 using the instructions 924. The instructions 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

In another illustrative embodiment a user can select a video or audio stream to be sent to an external audio or video device outside of the home via the IPTV network. In another illustrative embodiment a user can receive a video or audio from the house from a remote receiver or IP device and/or establish video or audio communication between the remote location and the audio and/or video devices in the home. In another illustrative embodiment motion detection on a camera sends alert to an STB of viewers with who a viewer wishes to communicate, alternatively email/SMS to additional device. In another illustrative embodiment, with management of available viewers at STBs and a buddy list to set up video sessions or audio with friends and neighbors. In another illustrative embodiment peer to peer video distribution "live broadcast" is provided.

In another illustrative embodiment a method for monitoring home remotely or controlling appliances in home via IPTV interface/portal is provided. Technologies to use are Zigbee, XIO, or RF remotes.

In another illustrative embodiment, IP-TV user interface is provided for that contains easy wizards to (1) identify Zigbee and RFID supported devices dynamically and incorporate functionality into the control interface, (2) let user set up X10 control codes for various appliances based on what she has configured in her home, (3) include smart remote capability to let user define other audio and/or video equipment in the home and where it is, so RF can be used to control other devices (and in this case the "closest" STB could be used to transfer the RF signals if it is with the other audio and/or video equipment to be controlled).

It should be noted that while the preferred embodiment of this video distribution architecture utilizes a FTTN or FTTH broadband network for IPTV delivery, it could similarly be implemented to work on alternative access networks including digital cable networks, satellite television systems, terrestrial wireless delivery networks (e.g. WiMAX) as bandwidth improves, or even 3G and 4G wireless networks using wireless handsets as the video authoring station.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computerized method for data communication comprising:

discovering at a first end user device, a plurality of discovered devices associated with a plurality of locations wherein the first end user device and the plurality of discovered devices are on a single residential network within a single residence;

creating a separate channel for each of the plurality of discovered devices on the residential network;

determining whether there is live motion video data and whether there is live audio data available from each of the plurality of discovered devices;

in response to live motion video data being available for a first discovered device, creating and inserting a separate channel number for the first discovered device into the electronic program guide data for the live motion video data from the first discovered device and an indicator for a video stream from the first discovered device and the live motion video data from the first discovered device into the electronic program guide data, dynamically configuring and displaying a pull down menu from a display field of the separate channel number for the first discovered device in an electronic program guide screen, indicating that the first discovered device has live motion video data available, establishing a two-way video connection between the first discovered device and the first end user device; and in response to audio data being available, inserting the separate channel number into the electronic program guide data for the first discovered device and an indicator for an audio stream from the first discovered device and the live audio data from the first discovered device, dynamically configuring and displaying a pull down menu from the display field of the separate channel number for the discovered device in the electronic program guide screen, indicating that the first discovered device has live audio data available establishing a two-way audio connection between the first discovered device and the first end user device;

providing over the separate channel for a selected device, a data stream consisting of video data only, audio data only and video data and audio data;

creating a live video data channel for the live motion video data;

simultaneously displaying on the electronic program guide screen a plural channel numbers for broadcast channels from external networks, the separate channel number and the indicator for each of the plurality of discovered devices, the live motion video data from the first discovered device and the full down menu from the display field of the separate channel number for the first discovered device; and sending the live motion video data to a video head end for distribution to a plurality of end user devices.

2. The method of claim 1, wherein the first end user device and a plurality of end user devices further comprise a plurality of set top boxes configured to receive internet protocol video data from a super video head end, the method further comprising:

creating on the single residential network, a live video data channel in the electronic program guide data for the live motion video data; and creating on the single residential network, a live audio data channel in the electronic program guide data for the live audio data.

3. The method of claim 2, wherein the first end user device further comprises a set top box, the method further comprising:

receiving from the set top box of the first end user device over the single residential network, the electronic program guide data at a first television connected to the set top box;

communicating with the set top box of the first end user device, using a radio frequency remote control signal from a second television remote control to select data from the electronic program guide screen displayed on the first television to select an internet protocol stream to receive at a second television wherein the internet protocol video stream received at a second television is different than an internet protocol video stream received at the first television.

4. The method of claim 3, further comprising:
sending the live motion video data to a second discovered device at a first location associated with the second discovered device.

5. The method of claim 3, further comprising:
establishing 2-way video data communication between a second discovered device and a third discovered device at a user location.

6. The method of claim 3, further comprising:
processing the available live motion video data at a second discovered device wherein processing is selected from the group consisting of recording, displaying and reproducing on a video display.

7. The method of claim 1, further comprising:
displaying a name associated with the first discovered device, wherein the name is selected from the group consisting of a user and a location.

8. The method of claim 1, further comprising:
displaying a plurality of live video screen displays, each of the plurality of video screen displays associated with one of the plurality of discovered devices;
receiving a user selection indicating one of the plurality of live video screen displays; and
establishing data communication with a location associated with the one discovered device associated with the selected screen display.

9. A non-transitory computer readable medium, containing a computer program comprising instructions that being executed by a computer perform a method for data communication, the computer program comprising:

instructions to send a message from a first end user device to at least one of a plurality of devices;

instructions to discover at the first end user device a plurality of discovered devices associated with a plurality of locations wherein the first end user device and the plurality of discovered devices are on a single residential network within a single residence;

instructions to create a separate channel number for each of the plurality of discovered devices;

instructions to determine whether there is live motion video data available from each of the plurality of discovered devices;

in response to live motion video data being available for a first discovered device, instructions to create and insert the separate channel number for the first discovered device into electronic program guide data for the live motion video data from the first discovered device and an indicator for a video stream from the first discovered device and the live motion video data from the first discovered device into the electronic program guide data, instructions to dynamically configure and display a pull down menu from a display field of the separate channel number for the first discovered device in an electronic program guide screen, instructions to indicate that the first discovered device has live motion video data available, instructions to establish a two-way video connection between the first discovered device and the first end user device; and in response to live audio data being available, instructions to insert the separate channel number for the discovered device audio stream into the electronic program guide data and a listing for available live audio data from the discovered device and an indicator for an audio stream from the discovered device and the live audio data from the discovered device; and instructions to adaptively display a pull down menu for the discovered device listed in the electronic program guide from the display field of the separate channel number for the discovered device, wherein attributes for the discovered device are adaptively displayed in the pull down menu to indicate for each discovered device listed in the electronic program guide provides a stream selected from the group consisting of video data only, audio data only and video data and audio data; instructions to create a live video data channel for the live motion video data;

instructions to simultaneously display on the electronic program guide screen a plurality channel numbers for broadcast channels from external networks, the separate channel number and the indicator for each of the plurality of discovered devices, the live motion video data from the first discovered device and the full down menu from the display field of the separate channel number for the first discovered device; and instructions to send the live video data to a video head end for distribution to a plurality of end user devices.

10. The non-transitory computer readable medium of claim 9, wherein the live motion video data comprises near real time data, the computer program further comprising instructions to create a live video data channel for the live motion video data and instructions to send the live motion video data to a video head end for distribution to a plurality of end user devices.

11. The non-transitory computer readable medium of claim 9, the computer program further comprising: instructions to accept an end user selection from data presented on the electronic program guide screen of a second discovered device from which to receive the live video data from the second discovered device.

12. The non-transitory computer readable medium of claim 11, the computer program further comprising: instructions to send the live motion video data to a second discovered device at the first location associated with the first discovered device.

13. The non-transitory computer readable medium of claim 11, the computer program further comprising:
instructions to establish 2-way video data communication between the second discovered device and a third discovered device at a user location.

14. The non-transitory computer readable medium of claim 9, the computer program further comprising: instructions to display a name associated with the first discovered device, wherein the name is one selected from a group consisting of a user and a location.

15. The non-transitory computer readable medium of claim 9, the computer program further comprising: instructions to display a plurality of screen displays, wherein each of the plurality of screen displays are associated with one of a plurality of discovered devices; instructions to receive user selection data indicating one of the screen displays; and instructions to establish video data communication with the one of the plurality of discovered devices associated with the selected screen display.

16. A system for near real time data communication comprising:
a processor in data communication with a non-transitory computer readable medium; and a computer program comprising data embedded in the non-transitory computer readable medium executed by the processor, the computer program comprising instructions to discover at a first end user device a plurality of discovered devices associated with a plurality of locations wherein the first end user device and the plurality of discovered devices are on a single residential network within a single residence;

instructions to create a separate channel for each of the plurality of discovered devices;

instructions to determine whether there is live motion video data available and instructions to determine whether live audio data is available from each of the discovered devices;

in response to live video data being available for a first discovered device, instructions to create and insert a separate channel number into electronic program guide data for available live motion video data from the first discovered device into the electronic program guide data, instructions to create and insert an indicator for a video stream from the first discovered device and the live motion video data from the first discovered device into the electronic program guide data, dynamically configuring and displaying a pull down menu from a display of the separate channel number for the first discovered device in an electronic program guide screen, indicating that the first discovered device has live motion video data available, establishing a two-way video connection between the first discovered device and the first end user device; and in response to live audio data being available, instructions to insert a separate channel number into the electronic program guide data for available live audio data from the first discovered device; instructions to adaptively display a pull down menu for the first discovered device from a display field of the separate channel number for the first discovered device listed in the electronic program guide screen, wherein attributes for the discovered device are adaptively displayed in the pull down menu to indicate for each discovered device listed in the electronic program guide screen provides a stream selected from the group consisting of video data only, audio data only and video data and audio data;

instructions to create a live video data channel for the live video data; and creating a live video data channel for the live video data;

instructions to simultaneously display on the electronic program guide screen a plurality channel numbers for broadcast channels from external networks, the separate channel number and the indicator for each of the plurality of discovered devices, the live motion video data from the first discovered device and the full down menu from the display field of the separate channel number for the first discovered device; and sending the live motion video data to a video head end for distribution to a plurality of end user devices; and instructions to send the live motion video data to a video head end for distribution to a plurality of end user devices.

17. The system of claim 16, wherein the live motion video data comprises near real time data selected from the group consisting of audio data and video data.

18. The system of claim 16, the computer program further comprising: instructions to accept an end user device selection of the first discovered device from the electronic program guide screen from which to receive the live motion video data.

19. The system of claim 18, the computer program further comprising: instructions to send the live motion video data to a second discovered device at the first location.

20. The system of claim 16, the computer program further comprising: instructions to display a name associated with the first discovered device, wherein the name is selected from a group consisting of a user and a location.

21. The system of claim 16, the computer program further comprising: instructions to establish 2-way live motion video data communication between a second discovered device associated with the first location and a third discovered device at a user location.

22. The system of claim 16, the computer program further comprising: instructions to display a plurality of video screen displays, wherein each of the plurality of video screen displays is associated with one of a plurality of discovered devices, instructions to receive a user selection indicating one of the plurality of video screen displays and instructions to establish video data communication with a second device at a location for the discovered device associated with the selected screen display.

* * * * *